United States Patent [19]

Burgess, III et al.

[11] 4,294,736

[45] Oct. 13, 1981

[54] ACCELERATED PROCESS FOR MAKING NONLINEAR POLYESTERS

[75] Inventors: William H. Burgess, III, Newark, Del.; Philip Heiberger, Broomall, Pa.

[73] Assignee: E. I. Du Pont de Nemours and Company, Wilmington, Del.

[21] Appl. No.: 132,839

[22] Filed: Mar. 24, 1980

[51] Int. Cl.$^3$ .......................... C08G 63/48; C09D 3/64
[52] U.S. Cl. ............................. 260/22 M; 260/22 CA
[58] Field of Search ....................................... 260/22 M

[56] References Cited

U.S. PATENT DOCUMENTS

| | | | |
|---|---|---|---|
| 3,039,980 | 6/1962 | Mallison | 260/22 M |
| 3,325,428 | 6/1967 | Graver et al. | 260/22 M |
| 4,045,392 | 8/1977 | Callahan et al. | 260/22 M |

OTHER PUBLICATIONS

Solomon, *The Chemistry of Organic Film Formers*, p. 86, John Wiley & Sons, Inc., N.Y., N.Y. (1967).
Bobalek et al., J. Applied Polymer Science, vol. 8, pp. 625–657 (1964).
Kirk-Othmer, Encyclopedia of Chemical Technology, vol. II, p. 33, John Wiley & Sons, Inc., N.Y., N.Y. (1978).

*Primary Examiner*—Ronald W. Griffin
*Attorney, Agent, or Firm*—James H. Ryan

[57] ABSTRACT

The reaction rate of the process for making nonlinear polyesters, i.e., conventional alkyds, is accelerated by using relatively large proportions of solvent, e.g., 15–50% by weight of an aromatic or ketonic high boiler, and, optionally, an esterification catalyst, e.g., tin oxalate. The process results in alkyds having more evenly distributed molecular weights with significantly reduced reaction times and at lowered reaction temperatures with consequent energy savings.

14 Claims, No Drawings

ACCELERATED PROCESS FOR MAKING NONLINEAR POLYESTERS

BACKGROUND OF THE INVENTION

1. Field of the Invention

This invention relates to speeding up conventional processes for producing nonlinear polyesters such as the alkyds.

2. Prior Art

The manufacture of alkyds is well known. See, e.g., Solomon, *The Chemistry of Organic Film Formers*, p. 86, Wiley (1967); and Kirk-Othmer, *Encyclopedia of Chemical Technology*, Vol. II, p. 33, Wiley (2nd Ed., 1978).

Around 4-5% by weight of solvent may be used to remove water evolved but 15% has been reported (Bobalek et al., J.Appl. Polymer Sci. 8, 628 (1964)) to minimize loss of volatile reactants and production of insoluble reaction products. Higher percentages of solvent have been used at elevated pressure: U.S. Pat. No. 3,325,428 (1967).

Catalysts are also sometimes employed: Callahan et al., U.S. Pat. No. 4,045,392 (1977). In most cases, the catalyst is used to catalyze the transesterification of a glyceride with a polyol, not to catalyze the polyesterification reaction. The catalysts are usually ineffective for polyesterification and are generally omitted.

SUMMARY OF THE INVENTION

Alkyds are conventionally made by heating the components in kettles in the presence of enough azeotroping solvent to assist in the removal of water formed at a temperature of about 225°-250° C., depending on the ingredients and atmospheric pressure. The vapors are condensed, the water separated and solvent returned to the kettle. In such procedure, the alkyd product needs dilution after production and the kettles usually need much cleaning, involving labor and down time.

In the present invention, the amount of solvent is increased and catalysts are optionally but preferably employed. The result is a product which needs little if any further dilution, cleaner kettles requiring less labor and down time for cleaning, and reduced reaction times and operating temperatures with resulting energy savings.

DESCRIPTION OF THE INVENTION

The present invention lies in improvements in the conventional processes for making the nonlinear polyesters called alkyds or alkyd resins. Alkyds are prepared by the esterification reaction of polybasic organic acids with polyhydric alcohols containing synthetic or naturally occurring monobasic acids. The reaction mixture may be modified with dibasic, tribasic or tetrabasic organic acids and anhydric or monobasic organic acids. An azeotroping solvent may be employed in small amount (solvent or azeotropic process) or omitted (fusion process) during the synthesis. In the present process, a solvent is employed but in larger quantity than conventionally.

In both conventional and present practice, the reactants for the alkyd are charged as a batch into a reaction vessel equipped with means to remove water from the process, such as reflux condenser and a bubble cap column, and a heat source which can be a heat exchanger or a high pressure water or steam jacket or the vessel. The reactants are agitated by a mixer in the vessel or by circulating by a pump. For example, they can be pumped from the bottom of the vessel through a pipe and heat exchanger and back into the vessel at the top. They are brought to a reaction temperature at normal pressure and water is removed from the process as the alkyd resin is formed. At the completion of the process, indicated by the high viscosity and low acid number of the product, the resin is rapidly cooled to prevent gelation.

Typical monobasic organic acids used conventionally as reactants to prepare alkyd resins are as follows: abietic acid, benzoic acid, p-tert-butylbenzoic acid, caproic acid, caprylic acid, capric acid, castor oil fatty acids, coconut oil fatty acids, cottonseed oil fatty acids, crotonic acid, dehydrated castor oil fatty acids, 2-ethylhexoic acid, lauric acid, linoleic acid, linolenic acid, oleic acid, perlargonic acid, rosin acids, soya oil fatty acids and tall oil fatty acids.

Typical dibasic organic acids and anhydrides that can be used are: phthalic acids and anhydride, adipic acid, azelaic acid, chlorendic acid, chlorendic anhydride, fumaric acid, isophthalic acid, maleic anhydride, fumaric acid, succinic acid, succinic anhydride, sebacic acid, and diglycolic acid.

Typical tribasic and tetrabasic organic acids or anhydrides that can be used are: citric acid, trimellitic acid, trimellitic anhydride, pyromellitic acid and pyromellitic dianhydride.

Typical glyceride oils that can be used are: castor oil, heat-bodied soya oil, coconut oil, corn oil, cottonseed oil, dehydrated castor oil, linseed oil, oiticica oil, safflower oil, soybean oil, and tung oil.

Typical polyhydric alcohols that can be used are: ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylolpropane, pentaerythritol, methylglucoside, dipentaerythritol, and sorbitol.

The reactants and the procedures used in the present improved process are substantially the same as the conventional ones enumerated above except for two process improvements: (1) the use of an unusually large amount of solvent, i.e., 15-50% by weight of the reactant mixture in the batch, and (2) the optional use of a catalytic amount of a polyesterification catalyst, i.e., 0.1-1.0% based on polybasic acid or anhydride used.

Any organic solvent can be employed that (1) is inert to the reaction mixture (alcohols, esters, ether alcohols, etc., thus being excluded) and (2) is volatile, i.e., refluxes at the desired esterification temperatures, e.g., 170°-230° C. The references listed above show conventional solvents usable here. Typical solvents are: aromatic solvents such as the high solvency aromatic hydrocarbon solvents; ketones such as methyl isobutyl ketone, methyl amyl ketone, isophorone; and chlorinated hydrocarbons. About 15-50% by weight of solvent based on the weight of reactants is usable with about 16-40% being preferred and 20-30% being most preferred.

The use of a solvent permits an appreciable lowering of the reaction temperature. For the normal fusion process, the temperature is about 230°-240° C. but can be higher. It is not much lower, if at all, in the conventional solvent process because so little solvent is used. In the present process with a 182°-219° C. range aromatic hydrocarbon, the reaction temperature can be 210°-215° C., actually ranging from about 200° C. for 45% solvent to 220° C. for 15% solvent. In addition, dilution produces a more uniform alkyd with easier control of the reaction.

In the conventional fusion and azeotropic processes, esterification catalysts do not exert a significant influence. Transesterification processes, in which a glyceride is alcoholized by polyols, require catalysts. These transesterification catalysts are also catalysts for esterification. However, in practice, these are also of limited influence. In the solvent process described in this invention, the catalytic effect is marked and, in fact, different from catalyst to catalyst. Here, esterification catalysts are preferably used with diluted batches and the reaction is easily controlled. The preferred catalyst is a tin compound, particularly tin oxalate at levels of 0.1 to 1.0% by weight metal based on phthalic anhydride. Higher levels are more effective but produce a cloudy but filterable solution. Other tin catalysts can be used such as n-butyltin oxide, dibutyltin dilaurate and tin oxide, as well as barium oxide, barium hydroxide, barium naphthenate, calcium oxide, calcium hydroxide, calcium naphthenate, lead oxide, lead naphthenate, lithium hydroxide, lithium naphthenate, lithium recinoleate, sodium hydroxide, sodium naphthenate, zinc oxide, lead tallate, and acids such as alkyl phosphoric acid or p-toluene sulfonic acid.

The improvements of the present process may be summarized in relation to the conventional processes as follows:

| Condition | Time |
|---|---|
| No solvent or catalyst | 8 hrs. |
| 30% solvent | 5 hrs. |
| 30% solvent plus Ca naphthenate | 4¾ hrs. |
| 30% solvent plus Pb naphthenate | 3¼ hrs. |
| 30% solvent plus Sn oxalate | 2¾ hrs. |

While any theory as to the operation of the present invention is highly speculative and is not intended to be binding on the applicants, it may be surmised that the polyesterification mechanism at the beginning of the reaction is different from that at the end. The complex 3-dimensional networks of alkyds apparently do not follow classical theories based on linear polyesters. Thus, by some fortuitous but as yet unexplained combination of circumstances, the use of significant amounts of solvent alters the reaction to speed the process, lowers the energy requirements and increases the response to catalysts. The solvent evidently plays several roles, e.g., viscosity control, ease of water removal, microgel control, temperature control, and mechanism alteration.

Typical known alkyd resins which can be prepared conventionally or by the improved process of this invention include: linseed oil/tung oil/glycerin/phthalic anhydride; soya bean oil/heat-bodied soya bean oil/pentaerythritol/phthalic anhydride; soya bean oil/glycerin/phthalic anhydride; linseed oil/tung oil/glycerin/isophthalic acid; linoleic acid/pentaerythritol/phthalic anhydride; linseed oil fatty acids/trimethylolpropane/phthalic anhydride/maleic anhydride; and coconut oil/glycol/phthalic anhydride.

Alkyd resins prepared by the improved process have substantially the same properties as those prepared by the usual solution or fusion processes but are more nearly uniform in molecular weight distribution as measured by gel permeation chromatography. Those made with a catalyst appear to dry a little harder than those prepared without the catalyst. All may be used in the normal utilities of alkyds, e.g., in paints and varnishes in the home and in industry to coat metals, plastic, wood and the like.

EXAMPLES

There follow some examples illustrating the invention in more detail. In these examples, parts and percentages are by weight, all pressures are ambient atmospheric, and temperatures are in degrees centigrade. Percentages of catalyst, where given, are based on dibasic acid used (phthalic anhydride). The first run disclosed is a control showing a conventional preparation with the composition of all other runs.

Control

A. This and the following syntheses were carried out in a well-stirred 5-liter batch reactor under a nitrogen blanket. Reagents other than solvent were charged in a batch size of approximately 1500 g and heated to reaction temperature as quickly as possible. Reaction rate was monitored by means of a Dean-Stark water trap attached to a reflux condenser and the reaction was considered complete when the acid number (A.N.) reached a value between 13 and 15.

B. The following was used as a basic charge for all runs (wt. percent total solids):

| Ingredient | Weight Percent |
|---|---|
| Fatty acid (linoleic acid; Hercules "Pamolyn 300") | 36.9 |
| Benzoic acid | 7.9 |
| Phthalic anhydride | 26.4 |
| Pentaerythritol, tech. | 26.1 |

This composition corresponds to a theoretical gel point at 101% reaction (based on a modification of Flory's theory of gelation (Solomon, op. cit., p. 81) assuming a pentaerythritol functionality of 4).

C. To the above unheated charge was added 4% by weight of a high-boiling aromatic hydrocarbon (b.p.=182°–219° C.) The mixture was heated to a reaction temperature of 230° C. In a reaction time of 8 hours, the reaction was found to be 87% complete based on the theoretical percentage of water recovered. This reaction time was accepted as the control. Data are in the Table below (Example 0).

EXAMPLES 1–11

High-Boiling Aromatic Solvent

The run of the control was substantially repeated several times except that percentages of the high-boiling aromatic solvent (Exxon Aromatic 150 or equivalent) were varied and a catalyst was used in some cases. Results are shown in the following Table:

TABLE

| Example | % Solvent | Maximum Reaction Temp. °C. | A.N.(1) | Visc.(2) | Solids | |
|---|---|---|---|---|---|---|
| 0 | 4 | 230 | 16.0 | Z6+ | 74.4 | (some microgel) |
| 1 | 14 | 218 | 13.7 | Z6+ | 82.5 | |
| 2 | 16 | 219 | 13.2 | — | 82.7 | |
| 3 | 30 | | 15.4 | Z6+ | 72.3 | |
| 4 | 45 | 215 | 15.0 | T+ | 55.3 | (crystalline |

TABLE-continued

| | | | | | | |
|---|---|---|---|---|---|---|
| | | | | | | gel discarded) |
| 5 | 15 | 210 | 12.6 | Z6+ | 88.8 | |
| 6 | 30 | 225 | 13.3 | Z6+ | 74.9 | |
| 7 | 30 | 214 | 10.8 | Z6+ | 64.1 | |
| 8 | 30 | 213 | 12.0 | Z6 | 77.0 | |
| 9 | 30 | 214 | 12.7 | Z-5 | 63.7 | |
| 10 | 30 | 214 | 16.5 | Z-6+ | 67.1 | |
| 11 | 45 | 213 | — | Q | — | (crystalline gel discarded) |

| Example | Reaction Time $T_1/T_2$ (3) | Water (Theoretical %) | Catalyst |
|---|---|---|---|
| 0 | 1.00 | 87 | — |
| 1 | 0.69 | 94 | — |
| 2 | 0.77 | 98 | — |
| 3 | 0.69 | 100 | — |
| 4 | 1.10 | 100 | — |
| 5 | 0.75 | 95 | — |
| 6 | 0.34 | 103 | ¼% tin oxalate |
| 7 | 0.23 | 102 | 1% tin oxalate |
| 8 | 0.36 | >100 | ¼% Fascat 4100 (proprietary M&T Chemicals tin catalyst) |
| 9 | 0.53 | 100 | ¼% lead naphthenate |
| 10 | 0.53 | 100 | ¼% calcium naphthenate |
| 11 | ≦1.10 | 100 | ¼% tin oxalate |

Notes:
(1) A.N. is the acid number of the finished batch
(2) Viscosity is given on the Gardner-Holdt scale.
(3) Reaction Time $T_1/T_2$ is the ratio of $T_1$ (= actual time for completion) to $T_2$ (= 8 hrs.; see Control).

EXAMPLE 12

Ketone Solvent

A run was made substituting 45% isophorone (bp about 215°) and 1/4% tin oxalate for the solvent of the Control Example. 106% of the theoretical water production was obtained at 220° C., A.N.=13 and $T_1/T_2$=84. The solution was free of gel.

Having described our invention, we claim:

1. In a process for the manufacture of an alkyd resin by reaction between a polybasic acid, a polyhydric alcohol and a fatty acid under reaction temperature conditions with removal of water formed in the process, the improvement which comprises carrying out this reaction in 15-50% by weight, based on the weight of the reaction ingredients, of an inert volatile organic solvent.

2. The process of claim 1 wherein the solvent comprises 16-40% by weight of the reaction ingredients.

3. The process of claim 1 wherein the solvent comprises 20-30% by weight of the reaction ingredients.

4. The process of claim 1 wherein the solvent is a high-boiling aromatic compound.

5. The process of claim 1 wherein the solvent is a ketone.

6. The process of claim 5 wherein the solvent is isophorone.

7. The process of claim 1 wherein the alkyd is based upon fatty acid, phthalic anhydride and pentaerythritol.

8. The process of claim 7 wherein the reactants also include benzoic acid.

9. The process of claim 1 employing also an esterification catalyst.

10. The process of claim 9 wherein the esterification catalyst is a tin compound.

11. The process of claim 10 wherein the tin compound is tin oxalate.

12. The process of claim 10 wherein the tin compound is n-butyltin oxide.

13. The process of claim 10 wherein the catalyst is calcium naphthenate.

14. The process of claim 10 wherein the catalyst is lead naphthenate.

* * * * *